(12) United States Patent
Haslmayr et al.

(10) Patent No.: US 10,612,108 B2
(45) Date of Patent: Apr. 7, 2020

(54) METHOD FOR HEATING STEEL SHEETS AND DEVICE FOR CARRYING OUT THE METHOD

(71) Applicant: voestalpine Stahl GmbH, Linz (AT)

(72) Inventors: Michael Haslmayr, Gutau (AT); Siegfried Kolnberger, Pasching (AT); Thomas Kurz, Linz (AT); Leopold Stegfellner, Wartberg ob der Aist (AT); Andreas Sommer, Abtsgmünd (DE)

(73) Assignee: voestalpine Stahl GmbH, Linz (AT)

( * ) Notice: Subject to any disclaimer, the term of this patent is extended or adjusted under 35 U.S.C. 154(b) by 445 days.

(21) Appl. No.: 15/328,469

(22) PCT Filed: Jul. 21, 2015

(86) PCT No.: PCT/EP2015/066634
§ 371 (c)(1),
(2) Date: Jan. 23, 2017

(87) PCT Pub. No.: WO2016/012442
PCT Pub. Date: Jan. 28, 2016

(65) Prior Publication Data
US 2017/0218473 A1    Aug. 3, 2017

(30) Foreign Application Priority Data
Jul. 23, 2014    (DE) ........................ 10 2014 110 415

(51) Int. Cl.
*C21D 9/46*    (2006.01)
*F27B 9/06*    (2006.01)
(Continued)

(52) U.S. Cl.
CPC ................. *C21D 9/46* (2013.01); *C21D 1/34* (2013.01); *C21D 1/40* (2013.01); *C21D 1/42* (2013.01);
(Continued)

(58) Field of Classification Search
None
See application file for complete search history.

(56) References Cited

U.S. PATENT DOCUMENTS 6,180,933 B1 *    1/2001    Demidovitch ......... H05B 6/067
                                                          219/645
2007/0271978 A1   11/2007   Brandstatter et al.
(Continued)

FOREIGN PATENT DOCUMENTS

DE    102009019496 A1    11/2010
DE    102009019573 A1    11/2010
(Continued)

*Primary Examiner* — George Wyszomierski

(57) ABSTRACT

A method for heating a blank or a preformed steel sheet component for hot forming and/or quench hardening purposes. In at least some regions, the heating is carried out to a temperature above AC3; the heating of the blank is embodied as a rapid heating and to this end, the blank is heated in a first zone at an average heating rate of >25 K/s up to about 600° C. and above this temperature, is heated at an average heating rate of >10 K/s up to a maximum of the AC3 temperature and then is transferred to a second zone in which the blank that has been preheated in the first zone is heated in at least some regions to temperatures greater than AC3, in particular >850° C., with the heating rate in the second zone being >10 K/s. The invention also relates to a device for carrying out the method.

17 Claims, 1 Drawing Sheet

(51) Int. Cl.
| | |
|---|---|
| *F27B 9/36* | (2006.01) |
| *C21D 1/42* | (2006.01) |
| *C21D 1/52* | (2006.01) |
| *C21D 1/673* | (2006.01) |
| *C21D 1/34* | (2006.01) |
| *C21D 1/40* | (2006.01) |
| *F27B 9/12* | (2006.01) |

(52) U.S. Cl.
CPC ............... *C21D 1/52* (2013.01); *C21D 1/673* (2013.01); *F27B 9/062* (2013.01); *F27B 9/068* (2013.01); *F27B 9/36* (2013.01); *C21D 2211/001* (2013.01); *C21D 2221/00* (2013.01); *F27B 2009/124* (2013.01); *Y02P 10/253* (2015.11)

(56) References Cited

U.S. PATENT DOCUMENTS

| | | | | |
|---|---|---|---|---|
| 2011/0042369 | A1* | 2/2011 | Ishiguro | B21D 37/16 219/539 |
| 2013/0074996 | A1* | 3/2013 | Omura | C21D 8/1244 148/645 |
| 2013/0306202 | A1* | 11/2013 | Joo | C21D 8/12 148/567 |
| 2014/0045130 | A1* | 2/2014 | Eckertsberger | C21D 1/34 432/18 |
| 2015/0211089 | A1* | 7/2015 | Fukunaga | C22C 38/001 266/249 |

FOREIGN PATENT DOCUMENTS

| | | |
|---|---|---|
| DE | 102009051157 B4 | 5/2011 |
| DE | 102010010156 A1 | 9/2011 |
| DE | 102010017905 A1 | 10/2011 |
| DE | 102011102167 A1 | 11/2012 |
| DE | 102011053672 A1 | 3/2013 |
| DE | 102012001742 A1 | 8/2013 |
| DE | 102012104537 A1 | 11/2013 |
| EP | 1830147 A1 | 9/2007 |
| EP | 1867738 A2 | 12/2007 |
| EP | 2014777 A1 | 1/2009 |
| EP | 2182081 A1 | 5/2010 |
| EP | 2237639 A1 | 10/2010 |
| EP | 2395116 A2 | 12/2011 |
| EP | 2730665 A1 | 5/2014 |
| JP | 2007245196 A | 9/2007 |
| JP | 2009095869 A | 5/2009 |
| WO | 2010048950 A1 | 5/2010 |
| WO | 2012045647 A1 | 4/2012 |
| WO | 2013000001 A1 | 1/2013 |

* cited by examiner

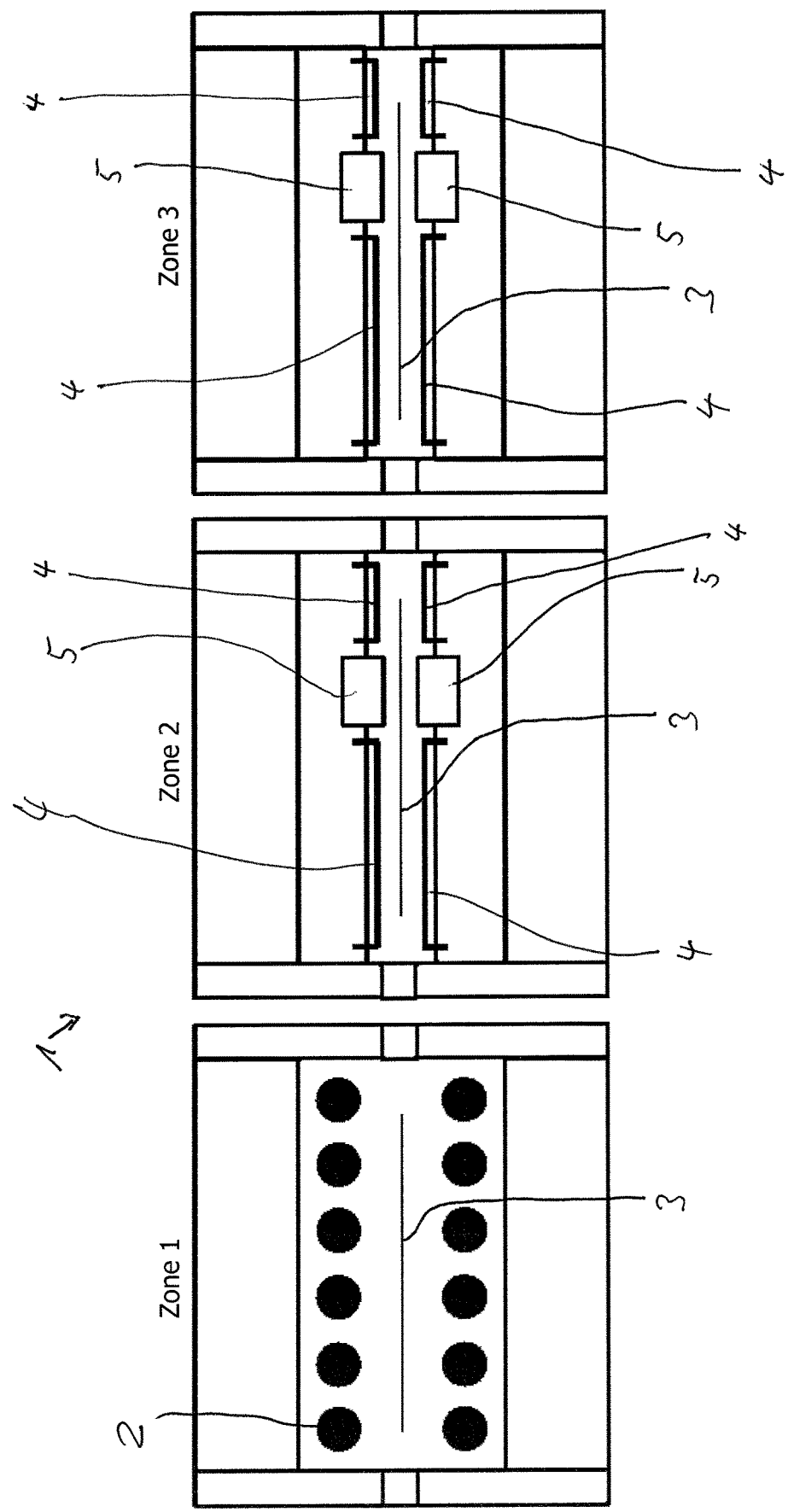

METHOD FOR HEATING STEEL SHEETS AND DEVICE FOR CARRYING OUT THE METHOD

FIELD OF THE INVENTION

The invention relates to a method for heating steel sheets, especially steel sheets that then undergo a hot forming step and a hardening step, and a device fir carrying out the method.

BACKGROUND OF THE INVENTION

It is known that steel sheets that are to undergo a hot forming step and a quench hardening must first be heated— at least in some areas—to an austenitizing temperature in order to enable a transformation of the austenite into martensite and thus the production of a hardened structure.

To this end, the structure must be heated, in particular to a temperature above the so-called AC3 point of the steel material.

WO 2013/000001 A1 has disclosed a method for heating a molded part for a subsequent press hardening and has disclosed a continuous furnace in which a molded part, which has been preheated to a predetermined temperature, is heated to a higher temperature in some regions.

The text therein states that hardening structures, which at austenitic steels can yield tensile strengths of greater than 1,500 MPa with an elongation in the vicinity of 6%, are often only required in subregions of the workpiece, while in other regions, higher elongations of for example 15% to 17% are required. Consequently, according to this cited document, a method for heating a molded part to different temperatures should be embodied so that despite a continuous passage through a heating unit, the molded parts receive a heat treatment—which is required for the subsequent press hardening—with an improved temperature control. For this purpose, this document proposes that as it is being fed through a field of heating elements, with the aid of heating elements that are arranged in longitudinal rows and transverse rows relative to the feed direction and can be activated at least in groups with different heating power, the molded part, is heated differently so that parts of the sheet metal reach an austenitizing temperature, whereas other parts of the sheet metal do not reach this temperature. According to this measure, heating elements with different heating capacities can be activated; with the possibility of activating heating elements independently of one another at least in groups, both along longitudinal rows and along transverse rows, it is possible while the components are being conveyed to influence the temperature of the molded parts in a longitudinal strip extending in the feed direction in order to be able not only to achieve but also to maintain preset temperature levels in the region of these longitudinal strips. In addition, cooling devices in the feed direction can also be activated along desired longitudinal strips in order to cool the components in strips.

DE 10 2012 001 742 A1 has disclosed a device for heating sheet metal workpieces for a subsequent hot forming and in particular press hardening. This device should either not have the disadvantages associated with roller hearth furnaces or should only have them to a reduced degree and should have the capacity to be flexibly operated with different heating requirements. To this end, the device should have a plurality of heating stations; a first heating station should be provided, with an inductive or inductively operated heating unit in which the sheet metal workpieces can be quickly heated to a predetermined temperature without dwelling awhile, a second heating station, in which the sheet metal workpieces dwell awhile and are thus heated or cooled to a predetermined temperature or are maintained at a predetermined temperature, and a third heating station in which the sheet metal workpieces dwell awhile and in the process, can be heated or cooled to a predetermined temperature or maintained at a predetermined temperature. Because of the inductive heating principle, the first heating station should enable a rapid and targeted heating of the sheet metal workpieces; the first heating station is preferably embodied as a feed-through station and the sheet metal pieces to be heated are conveyed through the first station individually or possibly also several at a time and without an appreciable dwell time; the heating can take place by means of longitudinal field- or transverse field induction. The second and third heating stations can be operated differently, depending on the heating requirements; the second or third heating station has at least one electrically operated heating unit and at least one heating unit operated by means of fuel combustion. The two heating stations in this case should be embodied as non-feed-through stations, whereas the third heating station is preferably embodied as a feed-through station. In order for the sheet metal workpieces, which are to be heated, to be conveyed or guided through, a main path is provided in which the third heating station is situated, and at least one secondary path is provided, in which the first and second heating stations are situated; the main path and the secondary path have a crossing region, with at least one shunt for transferring the sheet metal workpieces from one path to the other. Preferably, the second heating station is embodied as a non-feed-through station, in particular, the second heating station is embodied as a stacking furnace or has a stacking furnace.

DE 10 2009 019 496 A1 has disclosed a device, which includes three successive heating stations, which the sheet metal workpieces to be heated pass through in sequential fashion. The first heating station in this case has an inductive heater with which the sheet metal pieces to be heated can be quickly heated to a high temperature of up to several 100° C. Then the sheet metal workpieces that have been heated in this way are conveyed to the subsequent heating stations.

DE 10 2009 051 157 B4 has disclosed a method for heating a component for a hot forming, in which the component is heated to a desired temperature in a furnace; the furnace is embodied in the form of a chamber furnace and the internal temperature of the furnace is above the desired temperature of the component at every moment of the heating; when the desired temperature is reached, the component is removed from the furnace without having assumed the excess temperature of the furnace. In this case, the intent is for the method for heating a component for a subsequent hot forming to be improved such that the long heating times in the furnace are reduced and the footprint of the furnace system is significantly reduced.

DE 10 2010 017 905 A1 has disclosed a method for hot sheet forming in which the hot sheet forming is carried, out by heating, a sheet in a first step with inductive heating by means of a first induction heating device to a temperature less than or equal to the Curie temperature and in a second step, the heating to temperatures >800° C. is carried out by means of conventional heating in a furnace or by means of inductive heating in a second induction heating, device that is different from the first. With the method, the heating in the first step can take place, in two sub-steps; in a first sub-step, the sheet is heated to a first temperature and in a second sub-step, the sheet can be kept at a temperature more than 70

K lower than the first temperature. This should enable a homogeneous melting of an AlSi protective coating. In the first step in this case, the protective coating on the sheet can be completely melted; the temperature in this case is close to the Curie temperature, i.e. from 710° C. to 770° C. In the second sub-step, a diffusion process can occur; for AlSi, this lies between 600° C. and 650° C.

DE 10 2009 019 573 A1 has disclosed a furnace and a method for heating at least one workpiece; a workpiece is transported by means of a workpiece support coupled to a transport device, from an intake region to an outlet region of the furnace. The furnace includes two heatable chamber regions, which are situated on top of or also next to each other. The intake and outlet regions of the furnace are likewise situated on top of or next to each other. The workpiece to be heated is first transported on a workpiece support by the transport device through the first chamber region and then through the second; in this case, the transport direction of the workpiece support in the first chamber region is opposite from the transport direction in the second chamber region.

EP 1 830 147 B1 has disclosed a multi-chamber continuous furnace with a protective gas operation and method for oxide-free heating of galvanized workpieces; this is intended to ensure a scale-free heating of galvanized workpieces in a continuous furnace. The furnace in this case is divided into a plurality of chamber regions in each of which protective gas mixtures, preferably of different compositions, are supplied via infeed points, the composition of the protective gas being adapted to the temperature of the workpieces in the respective region of the furnace. The protective gas mixture with the lowest oxygen percentage is supplied in the last chamber region in this case. Between the individual chamber regions, the continuous furnace has corresponding protective gas guidance systems, preferably in the form of dividing walls with openings through which the overall flow of the protective gas can be guided so that a convection roll through the entire continuous furnace is prevented and the speed of the protective gas flow through the continuous furnace is higher than the back diffusion speed. The protective gas mixture is produced through partial combustion of a hydrocarbon/air mixture in a noble metal catalytic converter.

DE 10 2012 104 537 A1 has disclosed a furnace system and a method for operating it in which light alloy components are fed through the furnace system and, inside the furnace system, are heated and possibly cooled with a flow of air or gas.

DE 10 2010 010 156 A1 has disclosed a method for manufacturing a molded part with at least two structure regions of different ductility, this enables the treatment and forming of corresponding semi-finished products or blanks to take place at the cyclical rhythm of the press hardening tool, without influencing the throughput speed through the continuous furnace and in this case, after passing through the continuous furnace, the semi-finished product is inserted with the second subregion into a chamber of a buffer, which keeps the second subregion at the austenitizing temperature, while the first subregion protrudes out from the chamber of the buffer and this protruding region is air-cooled to the temperature at which the ferritic structure is formed.

It should be generally noted that press hardening is a very challenging technique in which it is important to insert the ready-heated blanks or semi-finished products into the tool at the right time, to press them, and to thus cool them and harden them at the same time.

In addition, it is important for the components to in filet be austenitized in the regions that are to be hardened or for them to be completely austenitized, but it is not desirable for the components to be left in a furnace for longer than is necessary.

While many furnaces are embodied as continuous furnaces, i.e. ones that can be loaded and unloaded continuously, the press is operated cyclically so it is very challenging to coordinate the loading and unloading to and from the furnace on the one hand and the furnace dwell time on the other with the cyclical operation of the press.

By and large, it is desirable that with a sheet thickness of 1 mm to 2 mm, at most 0.8 mm to 3 mm, as well as a cycle time of 10 seconds and a target temperature of the blank of 900° C. with a dwell time of approx. 5 seconds, a homogeneity of +/−15° C. throughout the blank is achieved.

The heating methods mentioned in the prior art are in particular carried out by means of conduction, induction, or thermal radiation, in particular by means of open gas flames. It has turned out that none of these heating forms actually meets the requirements completely throughout the entire process.

Known furnaces for radiative heating include, for example, chain conveyor furnaces, roller hearth furnaces, lifting step conveyor furnaces, and multi-chamber furnaces.

In the methods and devices known front the prior art for radiative heating of components, as a rule, relatively long furnace times are required in order to heat the components to the desired temperature.

In addition, with heating types of this kind, either protective gas is used or oxygen is allowed to contact the component surface unhindered.

With galvanized components, the long furnace times of the kind that are necessary, for example, in radiation furnaces, result in a variety of disadvantages. These disadvantages lie in the fact that the gamma phase breaks up relatively quickly, the Fe content increases, and the electrochemical potential increases. In addition, the processing windows only last a limited time. Because of the short cycle time that is required in order to achieve economical operation, relatively long furnaces are frequently used, which are loaded with a plurality of parts one after the other. If there are problems or interruptions in the press or in the furnace, then this increases the amount or resulting rejects because the upper limit of the processing window is exceeded for all of the numerous parts in the furnace.

If an intense oxide formation occurs with galvanized components, these parts must then be cleaned.

But if an oxygen-free atmosphere is used with galvanized components, oxidizing loss usually occurs since no oxidation layer (or only a thin one) is able to form.

EP 2 014 777 B1 has disclosed a method and a device for thermally treating sheet metal. In this connection, a metal component is heated in a first method step and in a subsequent method step, is brought into contact with at least one contact plate. In this connection, the contact plate has a lower temperature as compared to the metal body. Due to the lower temperature of the contact plates, the metal body is cooled after the heating. In this case, it should be possible for this cooling by means of the contact plates to be favorably controlled in terms of the temperature control.

DE 10 2011 053 672 A1 has disclosed a method and an apparatus for heating a metal blank. In this case, a metal blank must be heated in a heating device; the heating device has at least one lower contact element and at least one upper contact element so that between the contact elements, which are adapted to the contour of the metal blank, the blank is heated to a temperature of 200° C. to 450° C. by supplying thermal energy.

DE 10 2011 102 167 A1 has disclosed a method for manufacturing a molded part with at least two structure regions of different ductility and has disclosed a heating unit. According to this method, a blank in a heating unit should contact at least one heating plate having at least two heating segments in such a way that the first heating segment, which is set to a temperature A, heats a first region of the blank to a temperature A and the second heating segment, which is set to a temperature B, heats the second region of the blank to a temperature B, with the heating of the first region and second region of the blank each occurring by means of thermal conduction.

EP 2 182 081 A1 has disclosed a method and a device for thermally treating a coated steel body. In this case, before a hot forming process, a sheet steel body is brought into contact with at least one first contact plate having at least one first surface section of the sheet steel body and at least one second contact plate having at least one second surface section of the sheet steel body. During the contacting, one contact plate should have a higher temperature than the sheet steel body.

EP 2 237 639 A1 describes a device and a method for heating, a body. In this case, a contact plate, which has at least two heating elements, is provided in order to contact the body that is to be heated.

EP 2 395 116 A2 has disclosed a device for heating steel plates. By means of this device, it should be possible to use a contact plate to heat different regions of the steel plate to different temperatures.

JP 2007-245196 A and JP 2009-095869 A have disclosed devices for contact heating.

WO 2010/048950 A1 describes a method for thermally treating a coated sheet steel body. According to this method, at least one contact plate for heating the sheet steel body has a higher temperature greater, than $A_{c3}$ during the contacting, in particular a temperature between 20° C. and 250° C. from $A_{c3}$, so that an austenitization of the sheet steel body takes place.

WO 2012/045647 A1 describes a method and a furnace for treating workplaces. In this case, a workpiece should be heated by at least two heating elements in the furnace. In particular, the heating units have heatable pressure pistons.

The object of the invention is to create a method for heating steel sheets for hot forming and hardening purposes, which allows these steel sheets to be reliably and reproducibly brought to the necessary temperature.

Another object of the invention is to create a device for carrying out the method.

SUMMARY OF THE INVENTION

Basically, the method is a discontinuous or cyclical method, meaning that for example, a roller hearth or continuous furnace is not used. The heater or furnace includes at least two stations, but there can also be two structurally separate furnaces, with the zones in one structural unit being shielded, e.g., by means of firebrick, insulating plates, separating plates, or similar elements.

In this connection, specific types of heating are used; the heating in station 1 takes place inductively, by means of plate heating, radiant tubes, or gas burners and in station 2, takes place by means of radiant tubes, gas burners, or plates, but under no circumstances does it take place by means of induction. The heating rate of the sheet metal in station 1 is >25 K/s from room temperature to 600° C., is >10 K/s from above 600° C. until a low sheet-specific AC3, and the heating rate of the sheet in station 2 is >10 K/s.

All of the heating rates in this application refer to the average heating rate over the given temperature range.

The sheet metal blanks are in particular molding blanks made of coated sheet metals, particularly ones that are composed of an, aluminum-based alloy such as AlSi preferably sheet metals coated with a zinc alloy.

Since the emissivity of pure zinc coatings and pure hot-dip coatings changes during the heating and therefore the behavior with regard to heat absorption changes as well, according to the invention, preferably galvannealed sheet metal (ZF) is used because its emissivity changes to a lesser degree.

In particular, the sheets are supplied to a so-called direct process, i.e. after the heating, the sheets are directly shaped and hardened. Preferably, these sheets are composed of so-called boron-manganese steels, such as the widely used 22MnB5; it is also conceivable, however, to use other suitable quench-hardenable types of steel.

Basically the device is composed of a preheating zone, an austenitization zone, and a homogenizing and holding zone. Theoretically, it would also be conceivable to use preheated blanks, from a continuous furnace.

In zone 1, the heating is carried out at a heating rate of >25 K/s, for example from room temperature up to approx. 600° C., and at a heating rate >10 K/s from above approx. 600° C. up to a temperature that is below the AC3 temperature of the steel material, i.e. no austenitization takes place.

The second zone is the austenitization zone, in which the sheets are heated in at least subregions to approx. 900° C., preferably 850° C., at a rate >10 K/s.

In the third zone, the sheets are kept at 850° C. to 950° C., preferably 900° C.

In zones 2 and 3, an electric heating can be carried out preferably with cooling inserts; in zone 3, it is optionally also possible to work without additional energy supply and removal if it turns out in the process that the sheets emerge from the austenitization zone with sufficient heat.

With a heating rate >25 K/s, the sheets are subject to a distinctly rapid heating; as explained above, hot-dip galvanized material (Z) is particularly unsuitable for the rapid heating by means of radiation since the emissivity changes erratically. This is not true, however, for galvannealed coatings (ZF).

In zone 1, the preheating zone, for example jacketed radiant tubes or open flames are preferably used, with the temperature of the one being approx. 1,300° C. so that the blank is heated to about 600° C. in about 10 seconds.

Alternatively, the zone temperature can be about 1,100° C. so that a 600° C. blank temperature is achieved after approximately 20 seconds; two blanks can each be kept simultaneously in zone 1.

Alternatively, the blank can be heated from room temperature to the Curie temperature in zone 1 by means of a longitudinal field inductor.

Preferably, an electric heating module can be used in zone 2, i.e. the austenitization zone, but this module must be adapted to the form of the blank.

Tailored parts and so-called tailored property parts or partially hardened blanks can be produced by means of component-specific optimization of the meander of the heater and possible cooling inserts.

In this zone, zone temperatures of 1,000° C. to 1,400° C. and preferably 1,100° C. to 1,300° C., are provided in order to heat the blanks from about 600° C. to about 850° C. in approximately 10 seconds.

The technical explanations for the holding zone correspond essentially to those for zone 2, but the zone temperature, at about 950° C., is significantly lower.

In tailored property parts and partially hardened molded parts, in order to achieve regions that should remain unhardened, i.e. in order to not exceed the AC1 temperature, these regions can be shielded during the pass through the heater, e.g. with fiber composite ceramic plates fastened to the blank support.

In this case, different temperatures can be imparted across the blank in the electrically heated zones 2 and 3 inclusive through the inclusion of cooling inserts; in particular, the blank maintains a temperature of 600° C. to 700° C., at most 750° C., in all regions, but the regions that are to be austenitized are heated to a higher temperature.

With tailored welded blanks, i.e. sheets that are welded together out of sheets of different thicknesses, in zone 1, the thinner regions assume a higher temperature than the thicker regions; this temperature difference can be compensated for by means of a one-sided shielding or can be compensated for in the electrically heated zones 2 and 3.

The invention is based on the realization that the emissivity of the laser welding seam in TWB sheets is higher than that of zinc so that in zones 2 and 3, it is correspondingly possible, through the use of shields and/or corresponding selective heating, to also homogenize the regions of the laser welding seam with the rest of the blank.

According to the invention, the thermal capacity of the blank support in the furnace should turn out to be as low as possible. According to the invention, therefore, ceramic parts, in particular fiber composite ceramic pans, are preferable since they have high strengths, combined with a favorable emission behavior, a low thermal conductivity, and a low volumetric thermal capacity.

If shielding plates are used, these must cool sufficiently before being reused so that the shielded blank regions are assured of not reaching the AC3 temperature and in particular the AC1 temperature; it is advantageous to keep a relatively larger number of shielding plates on hand so that fresh shielding plates can be supplied to the rapid heating process while the used shielding plates can be allowed to cool. Alternatively, the shielding plates can also be actively cooled.

In order to bring the steel sheets to the necessary temperature for hot forming and hardening purposes, as an alternative to the above description, it is possible for at least two contact plates to be respectively provided in the first zone and/or in the second zone and/or in the third zone.

In this connection, a sheet metal part to be treated is placed between these at least two contact plates in order to bring it to the necessary temperature.

In this case, according to the invention, the first, second, and/or third zone are embodied as radiation furnaces. The two contact plates can then be placed, for example, on peaks made of firebricks, which are usually provided for accommodating sheet metal parts.

Alternatively, it is also possible for the contact plate to be heated electrically or by means of radiant tubes.

Consequently, an upper and lower contact plate can be positioned in such a furnace so that they are heated to the desired temperature.

After the upper and lower contact plates have reached the desired temperature, a sheet metal part is then placed in the region between the two contact plates.

According, to an advantageous embodiment, the upper and lower contact plates correspond approximately in shape and geometry to the sheet metal part that is to be heated.

Because the upper and lower contact plates correspond approximately to the geometry of the sheet metal part, this prevents intensive scale formation from occurring on the contact plates in the regions in which they do not contact a sheet metal part.

The contact plates can be composed of a hot-working steel.

The sheet metal parts are heated by means of the contact plates using thermal conduction, thermal radiation, radiation, and/or convection.

When heating is carried out by means of contact plates in the radiation furnace, this produces various advantages for galvanized sheet metal parts.

The heating to the desired temperature takes place relatively quickly, which makes it possible to produce steel sheets at the processing point. This also reduces the percentage of scrap generated. In addition, such a heating of steel sheet parts is extremely energy-efficient since heat losses are reduced and ideally, primary energy can be used for the heating. In addition, such systems with radiation furnaces containing contact plates for heating steel sheet parts are extremely compact and therefore require only a small amount of space. In addition, systems of this kind are extremely economical.

With a system of this kind, there are also positive effects on coating formation. Thanks to the oxide formation, it is usually possible to dispense with a cleaning of the sheet metal parts. An improved welding resistance is produced. Also thanks to the oxide formation, paint adheres better to the surfaces of the components. Furthermore, this yields a lower Fe content. In addition, there is a good electrochemical potential difference between the coating and the substrate. There is also an improved corrosion protection of the galvanized input stock, both in the direct process and in the indirect process.

The inventor has surprisingly discovered that although the surfaces of the steel sheets are covered by the contact plates, the zinc layer does not burn off in the furnace because enough oxides also form in the contact region between the steel sheet and the contact plates.

This can be attributed to the fact that the oxides on the steel sheet are produced through reduction of Fe oxides on the surface of the contact plates, which are composed of hot-working steel.

Also, in the uncleaned state, steel sleet parts treated in this way have low transition resistances.

By means of such a device or such a method, a precisely defined temperature can be introduced into the regions of the steel sheet that are in contact with the contact plates. In this way, it is possible to very exactly and homogeneously adjust the material properties that are produced by the thermal treatment.

A heating of this kind by means of contact plates in a radiation furnace can be adjusted in an extremely variable way since both the temperature of the contact plate and the time for the contacting between the contact plates and the metal sheet can be adjusted in an almost infinite variety of ways. In this way, a method according to the invention can be variably adapted to the desired parameters of the thermal treatment and to the material that is to be treated.

Preferably, the contact plate and the steel sheet to be treated contact each other directly.

In another embodiment variant, a pressing of the contact plates against the steel sheet with a force of 0.01 to 0.6 MPa, in particular 0.1 to 0.3 MPa can be provided. This improves the heat transfer and the resulting heating speed.

It is also possible to provide two or more contact plates for a component surface in order to treat different regions of a steel sheet with different temperatures.

BRIEF DESCRIPTION OF THE DRAWING

The invention will be explained based on a drawing; the sole FIGURE provides a very schematic cross-sectional depiction of the device for heating steel sheet blanks.

DETAILED DESCRIPTION OF THE PREFERRED EMBODIMENTS

The device 1 according to the invention is a heating device, which makes it possible to heat sheets and maintain their temperature in three different zones. In this case, the zones can be produced in a furnace that structurally forum a single unit, but it is also possible for the zones to be positioned structurally separate from one another. The transport from the zones to one another or into zone 1 or out of zone 3—is usually carried out with blank supports, which are inserted into the respective zones with grippers tar are transported within the zones with intrinsically known drives.

Regardless of whether the blank supports are inserted or driven, a cyclical advancing that is adapted to the press cycle is preferable.

Zone 1 is a preheating zone with rapid heating; in the preheating zone, jacketed radiant tubes 2 (or open flames) act on the blank 3. The zone temperature in this case is approx. 1,300° C. since such a high zone temperature ensures a rapid heating of the blanks to about 600° C. in 10 seconds.

Alternatively, the zone temperature can be selected to be somewhat lower so that a blank temperature of 600° C. is achieved after 20 seconds; but two blanks are heated simultaneously in zone 1. After the blanks have been heated in zone 1, they are transferred to zone 2.

Zone 2 is the austenitization zone; in the austenitization zone, electric heating modules 4, which are adapted to the blank form, act on the blank and bring about the temperature change from the existing temperature of the blank of at least 600° C. up to 850° C. at a heating rate of >10 K/s. The zone temperature in this case is set to approx. 1,200° C.

By means of the number and density of, the meanders, the electric heating modules 4 can be adapted to the blank, in particular to existing laser, welding seams, sheet thickness differences, and different emissivities of the surfaces of the blanks.

In regions in which the austenitizing temperature should not be achieved, in order to ensure that the blank does not heat further, cooling inserts or cooling elements 5 are provided. The cooling inserts and cooling elements are positioned so that the regions that should remain more ductile are efficiently prevented from reaching the austenitizing temperature. In lieu of cooling inserts, this can also be ensured by means of likewise provided shields, which can, for example, be made of fiber composite components, or shielding plates.

Because of the high zone temperatures in zone 1 and zone 2. It is particularly preferable for the blanks to only spend the time in these zones that is required to reach the target temperature of the blank and for them not to remain in these zones any longer since otherwise, an unwanted overheating can take place. This can be reduced in zone 2, however, by regulating the electric heating modules as needed.

Zone 3, which can be optionally provided, is a holding zone, which is comparable or identical to zone 2 in design, but has a significantly lower zone temperature (approx. 950° C.), which is suitable for maintaining the preset temperatures with which the blank has left zone 2 and/or the temperature profile with which the blank has left zone 2, taking into account the heat transfer between the electric heating modules on the one hand and the cooling elements on the other to and from the blank via the furnace atmosphere.

In this case, particularly with delayed-transformation hardenable steels in zone 3, a controlled cooling of the blank can also take place, provided that a preset temperature profile is maintained and no transformation takes place.

In this connection, zone 3 can be suitable for compensating for cycle differences between zone 1 and zone 2 on the one hand and the press on the other. To this end, zone 3 can in particular also have a plurality of positions in which the blanks can be kept until the shaping takes place.

Zones 1, 2, and 3 can have a coupled transport system or individual transport systems; the coupling can be both of a mechanical type and of a control-based type.

It has turned out to be particularly advantageous to work with very high heating rates in the two stations; the heating rates can theoretically be the same, preferably the heating rate in the first zone is >25 K/s up to about 600° C. and is >10 K/s at above 600° C. so that the basic heating of the blank takes place very quickly. The heating rate of the blank in the second zone at which the austenitizing temperature is reached is usually somewhat less and amounts to >10 K/s.

In the optional third zone, the heating rate is <10 K/s and in particular, the heating rate there is virtually nonexistent and the blanks are just thermally homogenized and held.

In order to bring the steel sheets to the necessary temperature for purposes of hot forming and hardening, as an alternative to the approach described above, it is possible for the device to respectively have at least two contact plates in the first zone and/or in the second zone and/or in the third zone.

In this case, a sheet metal part that is to be treated is placed between two contact plates in order to bring it to the necessary temperature.

The first, second, and/or third zone are then embodied in the form of radiation furnaces. The two contact plates can then be placed, for example, on peaks made of firebricks, which are usually provided for accommodating sheet metal parts.

Consequently, an upper and lower contact plate can be positioned in such a furnace so that they are heated to the desired temperature.

After the upper and lower contact plates have reached the desired temperature, then a sheet metal part is placed in the region between the two plates.

According; to an advantageous embodiment, the upper and lower plates correspond approximately in shape and geometry to the sheet metal part that is to be heated.

The steel plates are composed of a hot-working steel. Naturally, the contact plates can also be positioned outside of the radiation furnace.

The invention claimed is:

1. A method for heating a blank or a preformed steel sheet component for hot forming and/or quench hardening purposes, comprising:

placing the blank or preformed steel sheet component between at least two contact plates;

rapidly heating the blank or preformed steel sheet component by heating the blank or preformed steel sheet component in a first zone, which is a preheating zone, at an average heating rate of >25 K/s up to about 600° C. and, above this temperature, heating the blank or preformed steel sheet component at an average heating rate of >10 K/s up to a maximum of the AC3 temperature; and then transferring the blank or preformed steel sheet component to a second zone, which is an austenitization zone, in which the blank or preformed steel sheet component that has been preheated in the first zone is heated in at least some regions to temperatures greater than AC3, with the heating rate in the second zone being >10 K/s, wherein the blank or preformed steel sheet component is coated with a zinc alloy and the at least two contact plates are composed of a hot-working steel and, as a result, oxides on the blank or preformed steel sheet components are produced during heating through reduction of Fe oxides on a surface of the at least two contact plates.

2. The method according to claim 1, further comprising, after heating in the second zone, transferring the blank or preformed steel sheet component to a third zone, which is a homogenizing and holding zone; wherein the heating rate in the third zone is 10 K/s or the heating capacity is dimensioned so as to ensure a controlled temperature decrease of the blank or preformed steel sheet component, but without undershooting transformation points of austenitized regions, or so as to ensure maintenance of a temperature and tempera profile of the blank or preformed steel sheet component achieved in the second zone.

3. The method according to claim 2, wherein the at least two contact plates heat the blank or preformed steel sheet component to a hot forming and/or quench hardening temperature in at least one of the group consisting of the first zone, the second zone, and the third zone.

4. The method according to claim 3, wherein placing the blank or preformed steel sheet component between two contact plates brings the blank or the preformed steel sheet component to a temperature necessary for forming and subsequent hardening.

5. The method according to claim 1, comprising heating the first zone with jacketed radiant tubes or open flames.

6. The method according to claim 5, wherein the zone temperature in the first zone is approx. 1,100° C. to 1,300° C.

7. The method according to claim 1, wherein the zone temperature in the second zone is 1,000° C. to 1,400° C.

8. The method according to claim 1, wherein the first zone, the blanks or preformed steel sheet components are heated using a longitudinal field inductor.

9. The method according to claim 1, wherein the heating rates in the first zone and second zone are matched to each other so that despite a different ΔT of the blanks or preformed steel sheet components from an inlet to an outlet of the zones, the heating respectively takes place at the same time in order to enable a time synchronization of heating cycles in the first and second zones.

10. The method of claim 1, wherein the blank or preformed steel sheet component is a boron-manganese steel.

11. The method of claim 1, wherein the heating in the first zone is carried out inductively, and the heating in the second zone is not carried out inductively.

12. The method of claim 1, further comprising applying at least one shield or insert to at least one region of the blank or preformed steel sheet component to shield the at least one region of the blank or preformed steel sheet component during the heating in the second zone in order to achieve at least one region of the blank or preformed steel sheet component that remains unhardened.

13. The method of claim 12, wherein the at least one shield or insert comprises a fiber composite ceramic part.

14. The method of claim 1, further comprising applying at least one shield to at least one region of the blank or preformed steel sheet component to shield the at least one region of the blank or preformed steel sheet component during the heating in the second zone in order to achieve homogeneous heating of the at least one region of the blank or preformed steel sheet component and a remainder of the blank or preformed steel sheet component.

15. The method of claim 1, further comprising selectively heating at least one region of the blank or preformed steel sheet component during the heating in the second zone in order to achieve homogeneous heating of the at least one region of the blank or preformed steel sheet component and a remainder of the blank or preformed steel sheet component.

16. The method of claim 1, comprising adapting heating of at least one region of the blank or preformed steel sheet component by either applying at least one shield to the at least one region of the blank or preformed steel sheet component, or selectively heating the at least one region of the blank or preformed steel sheet component, in order to achieve homogeneous heating of the at least one region of the blank or preformed steel sheet component and a remainder of the blank or preformed steel sheet component, wherein the at least one region of the blank or preformed steel sheet component comprises at least one of the group consisting of: a laser welded seam, a sheet thickness different than the remainder of the blank or preformed steel sheet component, and a different emissivity than an emissivity of a surface of the remainder of the blank or preformed steel sheet component.

17. The method of claim 1, wherein the at least two contact plates comprise upper and lower contact plates that correspond approximately in shape and geometry to the blank or preformed steel sheet component.

* * * * *

UNITED STATES PATENT AND TRADEMARK OFFICE
CERTIFICATE OF CORRECTION

PATENT NO. : 10,612,108 B2
APPLICATION NO. : 15/328469
DATED : April 7, 2020
INVENTOR(S) : Michael Haslmayr et al.

It is certified that error appears in the above-identified patent and that said Letters Patent is hereby corrected as shown below:

Column 11, Line 27, in Line 5 of Claim 2, "is 10 K/s" should read --is < 10 K/s--.

Column 11, Line 31, in Line 9 of Claim 2, "tempera" should read --temperature--.

Signed and Sealed this
First Day of September, 2020

Andrei Iancu
*Director of the United States Patent and Trademark Office*